United States Patent
Yamazaki

(10) Patent No.: US 7,379,229 B2
(45) Date of Patent: May 27, 2008

(54) ELECTROPHOTOGRAPHIC DISPLAY APPARATUS

(75) Inventor: Takuro Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 10/553,769

(22) PCT Filed: Jun. 8, 2005

(86) PCT No.: PCT/JP2005/010906

§ 371 (c)(1),
(2), (4) Date: Nov. 2, 2006

(87) PCT Pub. No.: WO2005/121888

PCT Pub. Date: Dec. 22, 2005

(65) Prior Publication Data

US 2007/0171510 A1    Jul. 26, 2007

(30) Foreign Application Priority Data

Jun. 8, 2004  (JP) ............................. 2004-170278
May 18, 2005 (JP) ............................. 2005-145911

(51) Int. Cl.
*G02B 26/00* (2006.01)
*G03G 17/04* (2006.01)
(52) U.S. Cl. ....................................... 359/296; 430/38
(58) Field of Classification Search ................ 359/296; 345/107; 430/32, 34, 38; 204/600
See application file for complete search history.

(56) References Cited

U.S. PATENT DOCUMENTS 3,804,620 A * 4/1974 Wells ........................... 430/38

| 6,844,958 B2 | 1/2005 | Kawai ........................ 359/926 |
| 2003/0086149 A1 | 5/2003 | Kawai ........................ 359/926 |
| 2005/0094247 A1 | 5/2005 | Kanbe ........................ 204/600 |

FOREIGN PATENT DOCUMENTS

| JP | 2001-265261 | 9/2001 |
| JP | 2002-062545 | 2/2002 |

OTHER PUBLICATIONS

Patent Abstracts of Japan, vol. 2003, No. 12 of Dec. 5, 2003 for JP 2004-139025.
Patent Abstracts of Japan, vol. 2000, No. 19 of Jun. 5, 2001 for JP 2001-033831.

* cited by examiner

*Primary Examiner*—William C Choi
(74) *Attorney, Agent, or Firm*—Fitzpatrick, Cella, Harper & Scinto

(57) ABSTRACT

In an electrophoretic display apparatus, a surface of the charged particle, the dispersion medium, and a surface of an inner wall on which charged particles are to be deposited satisfy any one of the following (A) to (D): (A) the charged particle surface is hydrophilic, the dispersion medium is hydrophobic or is hydrophobic and lipophobic, and the inner wall surface is hydrophilic; (B) the charged particle surface is hydrophobic, the dispersion medium is hydrophilic or is hydrophobic and lipophobic and the inner wall surface is hydrophobic; (C) the charged particle surface is hydrophobic and lipophobic, the dispersion medium is hydrophobic or hydrophilic, and the inner wall surface is hydrophobic, with the proviso that when the dispersion medium is hydrophobic, a difference in hydrophobicity between the dispersion medium and the charged particle surface is larger than a difference in hydrophobicity between the inner wall surface and the charged particle surface; and (D) the charged particle surface is hydrophobic and lipophobic, the dispersion medium is hydrophobic or hydrophilic, and the inner wall surface is hydrophobic and lipophobic.

8 Claims, 4 Drawing Sheets

(a)

(b)

(a)

(b)

(a)

(b)

ELECTROPHOTOGRAPHIC DISPLAY APPARATUS

CROSS-REFERENCE TO RELATED APPLICATIONS

This is a national stage of PCT/JP2005/01906, filed Jun. 8, 2005, under 35 U.S.C. §371.

TECHNICAL FIELD

The present invention relates to an electrophoretic display apparatus for moving a plurality of charged particles dispersed in a dispersion medium by the action of an electric field to effect display.

BACKGROUND ART

FIGS. 4(a) and 4(b) are sectional views showing an embodiment of a structure of a conventional electrophoretic display apparatus. The electrophoretic display apparatus shown in these figures includes a pair of substrates 101 and 102 disposed with a predetermined spacing therebetween, an insulating liquid 103 filled in the spacing between these substrates 101 and 102, a large number of colored charged particles 104 dispersed in the insulating liquid 3, and display electrodes 105 and 106 disposed on the substrates 101 and 102, respectively, pixel by pixel. The colored charged particles 104 are electrically charged positively or negatively. The insulating liquid and the colored charged particles are colored different colors. Between adjacent pixels, a partition wall 107 is disposed so as to prevent movement of the colored charged particles 104 to another pixel, thus retaining uniform display.

By applying a voltage between the display electrodes 105 and 106, when the colored charged particles 104 are collected on the lower electrode 106, the color of the insulating liquid 103 is visually recognized as a pixel color, as shown in FIG. 4(a). When the colored charged particles 104 are collected on the upper electrode 105, the color of the charged particles 104 is visually recognized as a pixel color, as shown in FIG. 4(b). By performing such control pixel by pixel, it is possible to effect varies displays in the electrophoretic display apparatus as a whole.

In the electrophoretic display apparatus which effects display in such a principle, it is considered that it becomes possible to continuously display of image written by electric addressing without requiring display retaining electric power (memory characteristic). When the image once written by electric addressing can be retained for a long time without requiring the display retaining electric power, it is possible to minimize a power consumption necessary for image display. Further, when the displayed image is carried, it is not necessary to carry a driving apparatus and a power source, so that it becomes possible to remove only a display device portion, thus resulting in excellent portability.

As a method of providing the memory characteristic to the electrophoretic display apparatus, some methods have been proposed. For example, a thixotropic property is imparted to a migration medium by incorporating an exposure lawellar clay mineral in the migration medium. The thixotropic property in such a property that a jelly-like state is retained during rest and on the other hand, a force is exerted on a system to increase fluidity, so that the system shows a liquid-like behavior. For this reason, it is possible to hold display particles for a long time to effect stable display (Japanese Laid-Open Patent Application (JP-A) No. 2001-265261).

Further, there has been reported that electric charges are generated by acid-base dissociation between a particle surface and a resin adsorbed by the particle and a solvating effect, and a synergistic effect of dispersion stability is achieved by a steric effect of the adsorbed resin, so that it is possible to provide an image display medium which compatibly realizes long-term stability and high response speed (JP-A No. 2002-62545).

In the electrophoretic display apparatus, such a condition between a substrate surface and charged particles capable of effecting repetitive adsorption and description with respect to the substrate surface is required. More specifically, it is necessary to hold the adsorption state stably and desorb the charged particles from the substrate surface at a relatively low voltage.

Further, in order to provide a display image with the memory characteristic, it is necessary to keep stably not only the adsorption state of the charge particle to the substrate surface but also such a state that other charged particles are deposited on the charge particle absorbed to the substrate surface.

Particularly, in the case of a horizontal movement type electrophoretic display apparatus in which charged particles are moved in a substrate surface direction as described later in embodiments of the present invention, not in the case of a vertical movement type electrophoretic display apparatus as shown in FIGS. 4(a) and 4(b), a display state is formed by switching a state wherein the charged particles are extended on one of electrodes and visually recognized from a display surface side and a state wherein the charged particles are collected to the other electrode and an exposed substrate surface is visually recognized.

In this case, one of the display states is such a state that the charged particles are collected on an electrode having a smaller area when viewed from the display surface side, so that the charged particles are present on the electrode in an overlying state. Accordingly, it is necessary to keep this overlying state stably.

DISCLOSURE OF THE INVENTION

An object of the present invention is to provide an electrophoretic display apparatus excellent in display stability and drive stability.

Another object of the present invention is to provide an electrophoretic display apparatus having less power consumption.

According to an aspect of those present invention, there is provided an electrophoretic display apparatus, comprising:

a display portion, an electrophoretic dispersion liquid, contained in the display portion, comprising charged particles and a dispersion medium for dispersing the charged particles, and an electrode for driving the electrophoretic dispersion liquid, wherein a surface of charged particle, the dispersion medium, and a surface of an inner wall on which the charged particles are to be deposited satisfy any one of the followings (A) to (D):

(A) the charged particle surface is hydrophilic, the dispersion medium is hydrophobic or is hydrophobic and lipophobic, and the inner wall surface is hydrophilic, (B) the charged particle surface is hydrophobic, the dispersion medium is hydrophilic or is hydrophobic and lipophobic, and the inner wall surface is hydrophobic.

(C) the charged particle surface is hydrophobic and lipophobic, the dispersion medium is hydrophobic or hydrophilic, and the inner wall surface is hydrophobic with the proviso that when the dispersion medium is hydrophobic, a difference in hydrophobicity between the dispersion medium and the charged particle surface is larger than a difference in hydrophobicity between the inner wall surface and the charged particle surface, and (D) the charged particle surface is hydrophobic and lipophobic, the dispersion medium is hydrophobic or hydrophilic, and the inner wall surface is hydrophobic and lipophobic.

These and other objects, features and advantages of the present invention will become more apparent upon a consideration of the following description of the preferred embodiments of the present invention taken in conjunction with the accompanying drawings.

BEST MODE FOR CARRYING TO THE INVENTION

Figure 1:
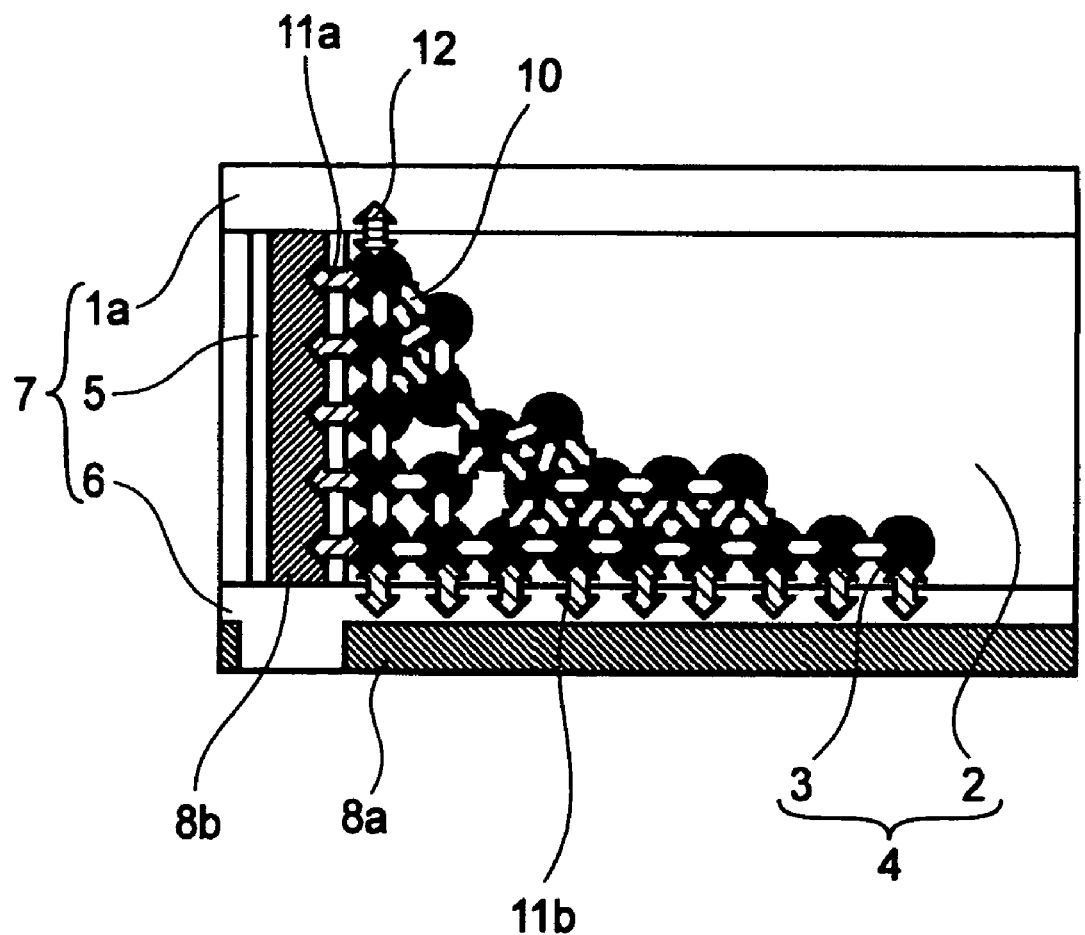
FIGS. 1, 2(a), 2(b), 3(a) and 3(b) are schematic sectional views each showing an example of a structure of an electrophoretic display apparatus according to the present invention.

In the electrophoretic display apparatus according to the present invention, charged particles and a dispersion medium for holding the charged particles satisfy any one of the following (1) to (6):

(1) a hydrophilic surface of charged particle with respect to a hydrophobic dispersion medium,
(2) a hydrophilic surface of charged particle with respect to a hydrophobic and lipophobic dispersion medium,
(3) a hydrophobic surface of charged particle with respect to a hydrophobic dispersion medium,
(4) a hydrophobic and lipophobic surface of charged particle with respect to a hydrophobic and lipophobic dispersion medium,
(5) a hydrophobic and lipophobic surface of charged particle with respect to a hydrophobic dispersion medium, and
(6) a hydrophobic and lipophobic surface of charged particle with respect to a hydrophilic dispersion medium.

Further, the charged particle surface has a high affinity for a surface of a space defined by partitioning a spacing between the pair of substrates with a partition wall, i.e., a surface of inner wall as a surface of display portion (hereinafter referred to as an "inner wall surface").

More specifically, the charged particle surface and the inner wall surface satisfy any one of the following (7) to (10);

(7) a hydrophilic charged particle surface with respect to a hydrophilic inner wall surface,
(8) a hydrophobic charged particle surface with re1spect to a hydrophobic inner wall surface,
(9) a hydrophobic and lipophobic charged particle surface with respect to a hydrophobic inner wall surface, and
(10) a hydrophobic and lipophobic charged particle surface with respect to a hydrophobic and lipophobic inner wall surface.

In other words, the electrophoretic display apparatus of the present invention includes the charged particles, the inner wall, and the dispersion medium which satisfy any one of the following (A) to (A) the charged paryicle surface is hydrophilic, the dispersion medium is hydrophobic or is hydrophiobic and lipophobic, and the inner wall surface is hydrophilic, (B) the charged particle surface is hydrophobic, the dispersion medium is hydrophilic or is hydrophobic and lipophobic, and the inner wall surface is hydrophobic.

(C) the charged particle surface is hydrophobic and lipophobic, the dispersion medium is hydrophobic or hydrophilic, and the inner wall surface is hydrophobic, with the proviso that when the dispersion medium is hydrophobic, a difference in hydrophobicity between the dispersion medium and the charged particle surface is larger than a difference in hydrophobicity between the inner wall surface and the charged particle surface, and (D) the charged particle surface is hydrophobic and lipophobic, the dispersion medium is hydrophobic or hydrophilic, and the inner wall surface is hydrophobic and lipophobic.

In the present invention, the term "hydrophobic and lipophobic" is used as a term different from the term "hydrophobic".

More specifically, the term "hydrophobic" is generally a super ordinate conception of the term "hydrophobic and lipophobic" but according to the inventor's findings, a combination of properties of the charged particles, the dispersion medium, and the inner wall for achieving the effects of the present invention is different between a hydrophobic material and a hydrophobic and lipophobic material.

For this reason, hereinafter, the hydrophobic material and the hydrophobic and lipophobic material will be described as mutually different materials. In the present invention, the hydrophobic property is a property different from a hydrophobic and lipophobic property. Further, the hydrophobic material does not embrace the hydrophobic and lipophobic material.

Hereinafter, an embodiment of the electrophoretic display apparatus of the present invention will be described with reference to FIG. 1 and FIGS. 3(a) and 3(b).

FIG. 3(a) is a view schematically showing a cross section of an embodiment of the electrophoretic display apparatus of the present invention. The electrophoretic display apparatus includes a pair of substrates 1a and 1b disposed with a predetermined spacing, and an insulating liquid 2 a plurality of charged particles 3 which are sealed in the spacing. An electrophoretic dispersion liquid 4 comprises the insulating liquid 2 and the plurality of charged particles 3 dispersed in the insulating liquid.

Between the substrates, a spacer for defining a cell gap may be disposed. The spacing between the substrates may preferably partitioned by, e.g., both of a partition wall 5 and the spacer or a partition wall 5 having also a function as the spacer. The partition wall 5 having also a function as the spacer. The partition wall 5 may preferably be disposed so that a small space defined by the pair of substrates 1a and 1b and the partition wall 5 corresponds to one pixel. Herein, the small space defined by the substrate 1a, an insulating layer 6 formed on the opposite substrate 1b, and the partition wall 5 is indicated as a display portion 14, and a surface layer of the display portion 14 is referred to as an "inner wall 7.

Figure 3:
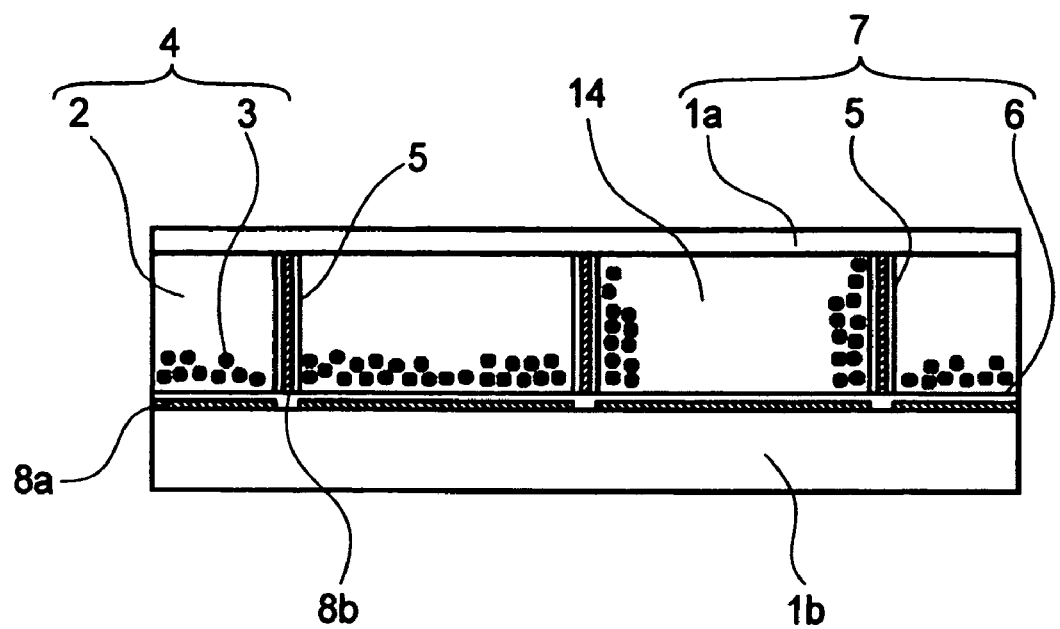
Figure 3:
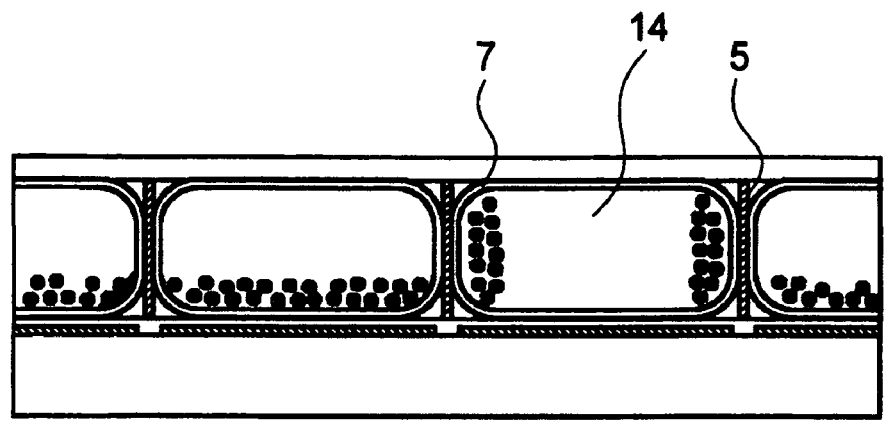
Figure 4:
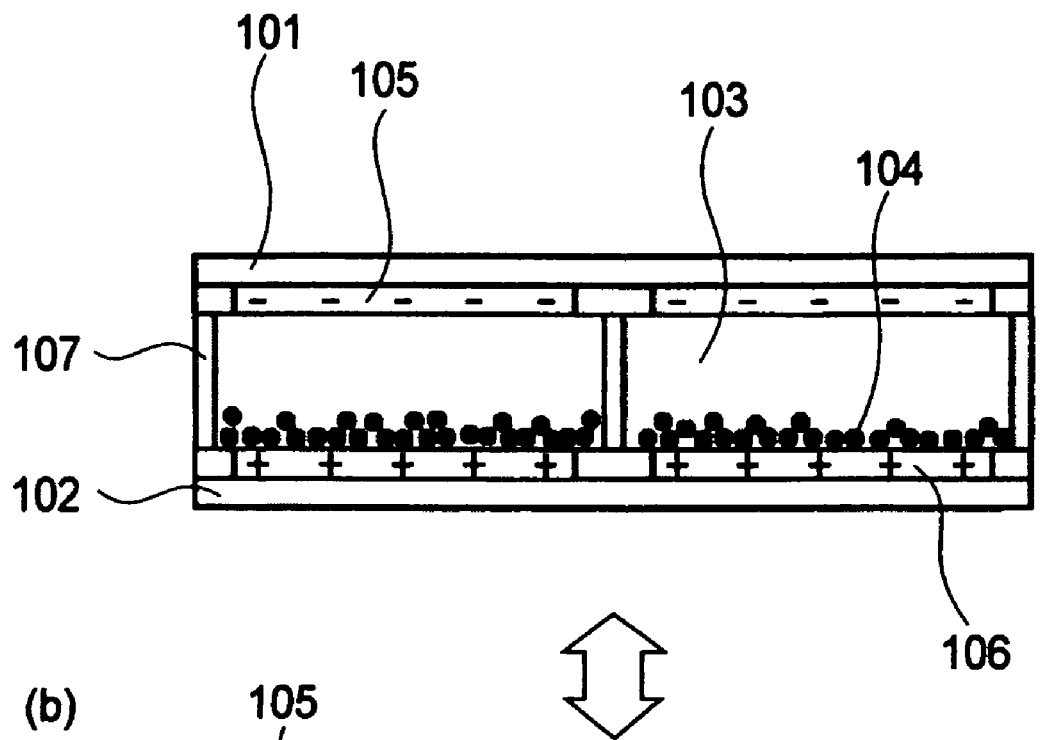
FIGS. 4(a) and 4(b) are schematic sectional views showing an example of a structure of a conventional electrophoretic display apparatus.
Figure 4:
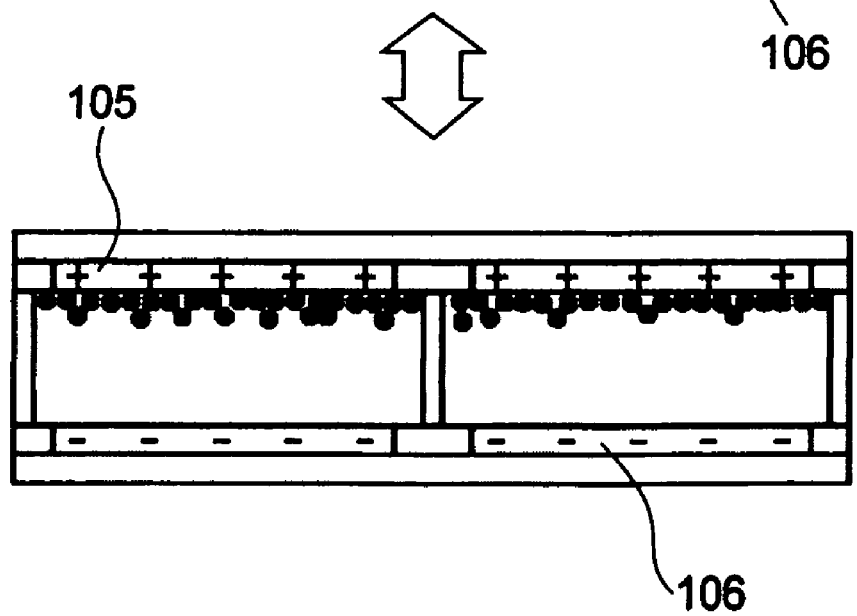

A pair of electrodes 8a and 8b may preferably be disposed at positions located in the neighborhood of the electrophoretic dispersion liquid 4, thus applying an electric field. Further, the insulating layer 6 may preferably be formed so as to cover these electrodes 8a and 8b, thus preventing injection of electric charges from the respective electrodes 8a and 8b to the charged particles 3. In FIG. 3(*a*), the electrodes 8a and 8b are disposed on the substrate 1b and the partition wall 5, respectively, but may also be disposed on either one of the upper substrate 1a and the lower substrate 1b or on the upper and lower substrates 1a and 1b, respectively. Further, the number of the electrodes is not limited to the with respect to the small space defined by the substrates 1a and 1b and the partition wall 5 but may be three or more.

Further, the inner wall 7 defining the small space may be a microcapsule. In this case, it is not necessary to form the partition wall 5 separately. In FIG. 3(*b*), the inner wall 7 is formed as the microcapsule in such a constitution that the electrode 8a is formed on the substrate 1b and the electrode 8b is formed in the partition wall 5.

In the case of using the electrophoretic display apparatus of the present invention as a reflection-type electrophoretic display apparatus, a reflection layer can be disposed on an opposite substrate (supporting substrate) opposite to a substrate (observation surface) disposed on an observer's side. The reflection layer may be separately formed on the supporting substrate or as an electrode also functioning as the reflection layer. Further, it is also possible to provide a scattering layer in order to improve visibility.

Next, a memory characteristic-imparting mechanism in the present invention will be described with reference to FIG. 1.

FIG. 1 shows such a state that the charged particles 3 are partially adsorbed on the surface of partition wall 5 and the surface of electrode 8a covered with the insulating layer 6. When the state is viewed from the observation surface side, the state corresponds to an intermediary display state in which the charged particles are partially visually recognized.

When a voltage is not applied, this state has to be held stably. More specifically, as schematically shown in FIG. 1, attractive forces 11a and 11b have to be exerted between the charged particles 3 and the inner wall (the surface of partition wall 5 and the surface of insulating layer 6) and an attractive force 10 has to be exerted between adjacent charged particles 3.

Particularly, in such a state that the charged particles 3 are collected on the surface of partition wall 5, the charged particles 3 are present in an overlying state. Accordingly, the attractive force 10 between the charged particles 3 is important in terms of retention of the memory characteristic.

In a conventional electrophoretic display apparatus, in order to import the attractive force 10 between the charged particles and the attractive forces 11a and 11b between the charged particles and the inner wall, various forces including intermolecular forces, such as van der Waals forces and hydrogen bond force; electrostatic attraction force; and a steric structure force by a polymer chain are utilized. These forces have been realized by appropriately selecting materials for the charged particles and the inner wall.

On the other hand, according to the combinations of the charged particles, the dispersion medium, and the inner wall defined in the present invention, the charged particles have a poor wettability with respect to the dispersion medium but the inner wall has an appropriate wettability with respect to the dispersion medium so as to reduce a contact area with respect to the dispersion medium. As a result, a contact state of the mutual charged particles or the charged particles with the inner wall is energetically dominant compared with a dispersion state of the charged particles in the dispersion medium in the electrophoretic dispersion liquid at each pixel, thus retaining the deposition state of the charged particles on the inner wall surface.

In the present invention, stabilization of the deposition state of the charged particles on the inner wall surface is utilized to provide the memory characteristic.

Hereinbelow, the conditions between the dispersion medium 2, the charged particles 3, and the inner wall 7 for generating these forces and adjusting magnitudes of the forces will be described more specifically.

As described above, the charged particles 3 satisfy any one of the following (1) to (6) with the dispersion medium 2:

(1) a hydrophilic surface of charged particle with respect to a hydrophobic dispersion medium, (2) a hydrophilic surface of charged particle with respect to a hydrophobic and lipophobic dispersion medium, (3) a hydrophobic surface of charged particle with respect to a hydrophobic dispersion medium, (4) a hydrophobic and lipophobic surface of charged particle with respect to a hydrophobic and lipophobic dispersion medium, (5) a hydrophobic and lipophobic surface of charged particle with respect to a hydrophobic dispersion medium, and (6) a hydrophobic and lipophobic surface of charged particle with respect to a hydrophilic dispersion medium.

By satisfying any one of (1) to (6) between the charged particles 3 and the dispersion medium 2, the charged particles 3 have less wettability with respect to the dispersion medium 2, so that the charged particles 3 are energetically stable when they are close to and deposited an each other to reduce a surface area for contacting the dispersion medium, rather than in such a high dispersion state that they have a larger amount of interfaces with the dispersion medium 2. Further, in a system satisfying any one of the above described conditions, such a force that the charged particles 3 are stably placed in a particle collection state, i.e., an inter-charged particle force 10 shown in FIG. 1 is effectively exerted between the charged particles 3.

However, when a voltage is applied between the electrodes 8a and 8b, the state of the charged particles 3 has to be charged from the collection state to the dispersion state. The dispersion state is desirably a uniform dispersion state but may also be such a state several particles are mutually deposited on each other so long as the electrophoretic display apparatus can be driven by the applied voltage.

In order to improve the dispersibility of the charged particles 3, it is effective to coat the surface of charged particle 3 with a polymer or add a dispersing agent and a charge control agent to the dispersion medium. In the present invention, the dispersibility is improved on the condition of any one of the above described conditions is satisfied. As a result, it is possible to compatibly realize the stability of collection state and the dispersibility under voltage application.

More specifically, in the present invention, a driving force and inter-charged particle force of the charged particles 3 under voltage application are controlled by the combinations of the hydrophilicity, hydrophobicity, and hydrophobicity and lipophobicity between the charged particle surface and the dispersion medium, whereby the inter-charged particle force 10 is dominantly exerted when the voltage is not applied between the electrodes 8a and 8b, thus retaining the collection state of the charged particles 3. On the other hand, when a voltage for providing a larger during force for the charged particles 3 than the inter-charged particle force 10 is applied, the charged particles 3 placed in the collection state are dispersed and electrophoretically migrate in accordance with an electric field profile.

By using the charged particles 3 and the dispersion medium which satisfy any one of the above described conditions (1) to (6), it is possible to realize such an irreversible dispersibility that the charged particles 3 are dispersed and migrate when the voltage is applied between the electrodes 8a and 8b and retain the collection state when the voltage is not applied.

Further, as described above, the charged particles 3 have also satisfy the following (7) to (10) with the inner wall 7:

(7) a hydrophilic charged particle surface with respect to a hydrophilic inner wall surface, (8) a hydrophobic charged particle surface with respect to a hydrophobic inner wall surface, (9) a hydrophobic and lipophobic charged particle surface with respect to a hydrophobic inner wall surface, and

(10) a hydrophobic and lipophobic charged particle surface with respect to a hydrophobic and lipophobic inner wall surface.

The charged particles 3 having an appropriate inter-charged particle attractive force defined by any one of (7) to (10) between the charged particles 3 and the inner wall 7 are energetically stable when they contact the inner wall 7, rather than at the time of forming the interface with the dispersion medium 2. More specifically, between the charged particles 3 and the inner wall 7, such a force that the charged particles 3 are stably placed in a deposition state, i.e., charged particle-inner wall attraction forces 11a and 11b shown in FIG. 1 is exerted.

In this case, in order to move the charged particles 3 to another place by applying a voltage between the electrodes 8a and 8b, the charged particles 3 have to be desorbed from the wall surface within the given voltage range.

Further, in the case of effecting halftone display, at least a part of the charged particles 3 are required to be placed in such a state that they are capable of being desorbed from the inner wall 7. For example, in the case where 50%-halftone display is effected when the state shown in FIG. 1 is an initial state, it is desirable that half of the charged particles 3 migrate by voltage application and remaining half of the charged particles 3 which are not required to migrate are placed in the deposition state on the inner wall 7.

Accordingly, it is necessary to appropriately increase the charged particle-inner wall attraction forces 11a and 11b. However, these forces must not be excessively increased.

As a method of decreasing the attraction force between the charged particles 3 and the inner wall 7, it has been known that such a method of coating the inner wall surface with a polymer is effective, in addition to the above described methods including the coating of the charged particles 3 with the polymer and the addition of the dispersing agent and the charge control agent to the dispersion medium.

In the present invention, adjustment of the attraction force is performed by appropriately controlling an affinity between the charged particle surface and the inner wall surface and an affinity between the charged particles and the dispersion medium. Even when a magnitude of the charged particle-inner wall attraction force fluctuates, by changing the charged particle-dispersion medium force depending on the magnitude of the charged particle-inner wall attraction force, it is always possible to compatibly realize a predetermined adsorption stability and desorption at a predetermined voltage.

More specifically, in the present invention, it is considered that the affinity between the charged particle surface and the inner wall surface is larger than the affinity between the charged particles and the dispersion medium, so that the attraction force between the charged particles 3 and the inner wall 7 is small. As a result, it is possible to appropriately provide the driving force of the charged particles 3 at the time of voltage application and the attraction force exerted between the charged particles 3 and the inner wall 7. Consequently, the charged particle-inner wall attraction forces 11a and 11b are dominantly exerted when the voltage is not applied between the electrodes 8a and 8b, thus holding stably the deposition state of the charged particles 3 on the inner wall 7. On the other hand, when a voltage for providing a driving force for the charged particles 3 larger than the charged particle-inner wall attraction forces is applied between the electrodes 8a and 8b, the charged particles 3 placed in the deposition state on the inner wall 7 are desorbed and migrate in accordance with an electric field profile.

In the present invention, affinities between the respective constitutional elements (the charged particle surface, the dispersion medium, and the inner wall surface are defined on the basis of correlations of wettabilities of the respective constitutional elements with respect to water or oil, more specifically, on the basis of the conditions of the hydrophilicity, the hydrophobicity, and the hydrophobicity and the lipophobicity between the respective constitutional elements. These wettabilities can be evaluated by measuring surface free energy or surface tension in manners described later.

When image writing is once effected by electric addressing, the image is stably displayed continuously without supplying a display retention electric power, so that the electric power is not required at a time other than the time when the display image is rewritten. In addition, it is possible to arbitrarily adjust interactive forces (attraction force and repulsion force) exerted between the materials for the charged particles, the dispersion medium, and the inner wall which constitute the display device portion of the electrophoretic display apparatus.

When the charged particles are designed to increase an amount of electric charge thereof, it is possible to set the conditions between the charged particles with the dispersion medium and the inner wall depending on the resultant chargeability. As a result, a voltage for effecting electrophoresis is suppressed to be a low level, whereby it is possible to reduce a power consumption.

When the affinity between the charged particles and the dispersion medium is larger than the affinity between the charged particles, at the time of applying a voltage between the electrodes, the charged particles in contact with other charged particles are peeled off other charged particles and driven, and then the charged particles in contact with the inner wall are peeled off and driven. As a result, it is possible to prevent the charged particles in the memory state from being driven while being placed in the agglomeration state, and it is possible to enhance the charged particle dispersibility during the drive. When the dispersibility is high, it is possible to readily control the drive of the charged particles, so that an accuracy of gradation display can be improved.

By using the charged particles 3 and the inner wall 7 which satisfy any one of the above described conditions (7) to (10), it is possible to provide such a irreversible deposition/description function that the charged particles 3 are desorbed from the inner wall surface when the voltage is applied between the electrodes 8a and 8b are kept in the deposition state on the inner wall when the voltage is not applied.

As described above, in the present invention, combinations of the dispersion medium 2, the charged particles 3 and the inner wall 7 satisfy any one of the following (A) to (D):

(A) the charge particle surface is hydrophilic, the dispersion medium is hydrophobic or is hydrophobic and lipophobic, and the inner wall surface is hydrophilic, (B) the charged particle surface is hydrophobic, the dispersion medium is hydrophilic or is hydrophobic and lipophobic, and the inner wall surface is hydrophobic, (C) the charged particle surface is hydrophobic and lipophobic, the dispersion medium is hydrophobic or hydrophilic, and the inner wall surface is hydrophobic, and (D) the charged particle surface is hydrophobic and lipophobic, the dispersion medium is hydrophobic or hydrophilic, and the inner wall surface is hydrophobic and lipophobic.

In the condition (C), in the case of selecting the hydrophobic dispersion medium, a difference in hydrophobic between the dispersion medium and the charged particle surface is larger than a difference in hydrophobic between the inner wall surface and the charged particle surface.

Further, in the conditions (C) and (D), the dispersion medium 2 may be a hydrophobic dispersion medium or a hydrophilic dispersion medium but it is desirable that the dispersion medium 2 has a high affinity for the inner wall 7 with respect to redispersion of the charged particles 3, so that the hydrophobic dispersion medium is effective in these combinations. In this case, however, in order to compatibly realize the memory characteristic and the dispersibility at high levels, the affinity between the charged particles 3 and the inner wall 7 may preferably be larger than an affinity between the charged particles 3 and the dispersion medium 2.

The above described combinations, between the charged particles, the dispersion medium, and the inner wall with respect to water or oil. In Table 1, columns represent properties of the inner wall, and rows represent properties of the charged particles. Further, in the matrix, cells at intersection of the respective rows and columns represent properties of the dispersion medium. In each cell, a left portion (numerator) represents a property of the dispersion medium, and a right portion (denominator) represents the kind of combination.

In Table 1, the respective marks have the following meanings:

A: hydrophilic
B: hydrophobic (not including hydrophobic and lipophobic)
C: hydrophobic and lipophobic
o: combination of the present invention
x: combination being out of the present invention

TABLE 1

| INNER WALL | CHARGED PARTICLES | | | | | | | | |
|---|---|---|---|---|---|---|---|---|---|
| | A | | | B | | | C | | |
| | | | | | | | | | |
| A | A/x | B/o | C/o | A/x | B/x | C/x | A/x | B/x | C/x |
| B | A/x | B/x | C/x | A/o | B/x | C/o | A/o | *<br>B/o | C/x |
| C | A/x | B/x | C/x | A/x | B/x | C/x | A/o | B/o | C/x |

* a difference in hydrophobicity between dispersion medium and charged particle surface is larger than a difference in hydrophobicity between inner wall surface and charged particle surface.

By selecting the specific combinations indicated by "o" from those shown in Table 1, the effects of the present invention can be achieved.

Incidentally, a condition between the dispersion medium 2 and the inner wall 7 is not particularly limited but, in addition to the above described combinations between the charged particles 3 and the dispersion medium 2 and between the charged particles 3 and the partition wall 7, the dispersion medium 2 may desirably have a high affinity for the inner wall 7 to a certain degree. More specifically, it is desirable that the dispersion medium 2 has a contact angle of not more than 30 degrees. In the case where the inner wall 7 is liable to be wetted with respect to the dispersion medium 2, it is possible to quickly re-disperse the charged particles 3 in contact with the inner wall 7 by the charged particle-inner wall attraction force 11a and 11b when a force for describing the charged particles 3 from the inner wall 7 is applied by electric addressing.

In the present invention, the conditions between the dispersion medium 2, the charged particles 3, and the inner wall 7 are defined by two combinations of physical properties selected from the hydrophilicity, the hydrophobicity, and the hydrophobicity and the lipophobicity.

With respect to the dispersion medium, the dispersion medium to be mixed with water is generally hydrophilic, and the dispersion medium to be phase-separated from water is generally hydrophobic. At a solid surface (layer), when the surface (layer) has a contact angle of less than 90 degrees, the surface is generally hydrophilic and when the surface has a contact angle of not less than 90 degrees, the surface is generally hydrophobic.

The hydrophobic and lipophobic dispersion medium is in such a state that it provides a poor mixture with not only water but also oil represented by n-alkane. Further, the hydrophobic and lipophobic surface in such a state that it has poor wettability with respect to not only water but also oil represented by n-alkane.

In the present invention, in the condition (C), in the case of selecting the hydrophobic dispersion medium (i.e., the combination of the hydrophobic and lipophobic charged particle surface, the hydrophobic dispersion medium, and the hydrophobic inner wall surface), the above described condition that the difference in hydrophobic between the dispersion medium and the charged particle surface is larger than that between the inner wall surface and the charged particle surface means such a condition that the state of the charged particles adsorbed on the inner wall under voltage application is more stable than the state of the charged particles dispersed in the dispersion medium when an electric field of 0 V is applied. The above described conditions between the differences in hydrophobic between the dispersion medium and the respective surfaces cannot be defined only by comparison of values of the contact angle and surface free energy is some cases. However, in the present invention, when the above described conditions are satisfied, the difference in hydrophobic between the dispersion medium and the charged particle surface is regarded as one larger than the different in hydrophobic between the inner wall surface and the charged particle surface.

On the other hand, the dispersion medium is hydrophobic and lipophobic when it contains a fluorine-containing compound. The charged particle surface and the inner wall surface and hydrophobic and lipophobic when they contain a fluorine-containing compound (at each surface) and the fluorine atom is not less than 0.1% per all the atom species at each surface. The fluorine-containing compound is generally a hydrophobic compound or substance. In this case, even when the fluorine-containing charged particle surface and the fluorine-containing inner wall surface have a contact angle of less than 90 degrees, they can be regarded as a hydrophobic surface.

In the present invention, when the compound having fluorine atom in an amount of not less than 0.1% has a contact angle of not less than 50 degrees (preferably not less than 60 degrees) with respect to water and a surface free energy of not more than 35 mN/m (preferably not more than 30 mN/m), the compound is determined as the hydrophobic and lipophobic compound irrespective of a value of the contact angle thereof with respect to oil.

Identification of the atom species constituting the surface layer of charged particle and the inner wall surface can be performed by an ordinary atom species analysis means, such as a time-of-flight secondary in mass spectrometer (TOM-SIMS) or the like.

In order to impart the hydrophilicity to the charged particle surface, the inner wall surface and the dispersion medium, it is possible to incorporate therein at least one species of the group selected from the amino group, amido group, imido group, carboxyl group, carbonyl group, hydroxyl group and sulfur group.

In order to impart the hydrophobicity to the charged particle surface, the inner wall surface, and the dispersion medium, it is possible to incorporate therein at least one species of group selected from the group consisting of halogen-substituted derivative, silicon atom, alkyl group, phenyl group, benzyl group, and naphthyl group.

Further, in the present invention, in order to impart the hydrophobicity and the lipophobicity, it is possible to incorporate at least fluorine atom.

Incidentally, in the present invention, the use of the halogen-substituted derivative containing fluorine atom for imparting the hydrophobicity is conveniently within the method of importing the hydrophobicity and the lipophobicity, not the method of imparting the hydrophobicity.

With respect to the charged particle surface and the inner wall surface, it is possible to incorporate a plurality of the above-described functional groups or atom species in the same surface layer, whereby it is possible to set the inter-charged particle attraction force 10 and the charged particle-inner wall attraction force 11 to optimum values.

With respect to the setting of the functional groups or the atom species contained in an associated surface layer, it is also important to perform the setting with attention to chargeability. For example, in order to impart a larger stable chargeability to the charged particles 3, it is possible to use methacrylic acid, fluorine-containing acrylic acid, fluorine-containing methacrylate acid, and the like.

In order to provide the plural species of the functional groups or the atom species at the same surface layer, it is possible to use a method using copolymerization of the plural species, a method using two-step polymerization, and the like for the charged particles 3 and use a method using a stepwise reaction with a silane coupling agent, a micro-patterning, of the surface layer, using an organic silane monomolecular film, and the like for the inner wall 7.

In the present invention, it is preferable that the charged particles 3 contain the fluorine atom-containing compound at each surface thereof, the inner wall contains the silicon atom-containing compound at the surface thereof, and the dispersion medium is a solvent containing a paraffin-based hydrocarbon compound.

With respect to the inner wall 7, it is possible to provide areas different in affinity for the charged particles 3 by the above described methods. For example, with respect to the inner wall 7 in contact with the dispersion medium 2, by setting different affinities for the charged particles 3 between an area constituting the partition wall 5 and an area constituting the insulating layer 6, it is possible to set different values of the charged particle-inner wall attraction forces 11a and 11b. Herein, the areas different in affinity for the charged particles 3 can be determined as areas in which contact angles obtained by forming droplets of water and oil are different from each other and as areas in which values of surface free energy (also called interfacial energy or surface tension) obtained by use of a measuring liquid, such as n-hexadecane, glycerin, formamide, methylene iodide, water, or the like are different from each other. In order to provide such an area that the charged particles 3 have a higher affinity for the inner wall 7, i.e., are more liable to be deposited on the inner wall 7, with respect to the inner wall 7 is increased when the difference in surface green energy between the surface layer of charged particle and the surface layer of inner wall is made large. Further, it is also possible to control the affinity between the charged particles 3 and the inner wall 7 by utilizing an electric interactive force or hydrogen bond force exerted between specific polar groups, and a specific surface which has a high hydrophobicity and a high lipophobicity obtained by fluorine atom.

With respect to the inner wall 7, in order to deposit the charged particles 3 on the substrate 1 side constituting the observation surface, it is possible to set the corresponding portion of the inner wall 7 as a surface having a low affinity for the charged particles 3. In this case, such a force that the deposition of the charged particles 3 is impaired (a charged particle-inner wall repulsion force 12, FIG. 1) is exerted between the charged particles 3 and the substrate 1a. As a result, the deposition of the charged particles 3 on the substrate 1a constituting the observation surface is prevented. It is also possible to provide a plurality of areas different in affinity for the charged particles 3 to be formed at the surface layer of the inner wall 7.

In the present invention, the condition between the dispersion medium 2, the charged particles 3, and the inner wall 7 is determined on the basis of magnitude of affinity obtained by the combination. As described above, the magnitude of affinity is determined by the value of the surface free energy. The surface free energy can be determined by using a wettability at a sample surface for a solid sample and an agglomeration force of a sample for a liquid sample, as an index. In this regard, a liquid having a large agglomeration force is less liable to wet the solid surface.

The surface green energy of the solid sample can be measured by a known method so long as the solid sample has a certain expanse. In the present invention, With respect to the inner wall 7, such a contact angle method that an angle θ between a solid surface and a standard liquid in contact with the solid surface is measured by using the same material as the inner wall 7 is used.

With respect to the charged particle 3, as a method of evaluating the wettability of powder with respect to a liquid, a penetration speed method described in "Ultrafine Particle Development and Application Handbook" issued by Science Forum Inc., is used. By obtaining an angle θ formed between a standard liquid and a solid surface, it is possible to determine a value of the surface free energy. As a measuring apparatus using the penetration speed method, a wet tester (mfd. by SANKYO PIO-TECK Co., Ltd.) and the like can be used.

A surface tension of the liquid sample can be obtained by calculating a value based on a shape of droplet formed by extruding a measuring sample from a needle of syringe and a density of a standard sample.

When a surface free energy γP of the surface layer of charged particle 3 and a surface free energy γL of the dispersion medium 2 satisfy the relationship: $|\gamma P - \gamma L| \leq 20$ mM/m, it is possible to impart an irreversible dispersibility of the charged particles 3. Further, when a surface free energy γW of the inner wall 7 and the surface free energy γP of the charged particle surface layer satisfy the relationship $|\gamma P-\gamma W| \leqq 20$ mN/m, it is possible to effect irreversible deposition control of the charged particles 3 on the inner wall 7 by application/no application of voltage.

Further, by appropriately selecting a combination of the dispersion medium 2, the charged particles 3, and the inner wall 7 satisfying the relationship: $|\gamma P-\gamma L|>\gamma P-\gamma W|$, it becomes possible to improve the memory characteristic under no voltage application, the dispersibility under application of voltage, and the drive stability under application of voltage.

Hereinbelow, the respective constitutional elements of the electrophoretic display apparatus shown in FIG. 3(a) will be described.

The materials selected as those for the charged particles, the inner wall, and the dispersion medium with respect to the above described combinations in the present invention are not only simply selected from combinations of available materials specifically shown below but also, as described above, it is important that a balance of wettability of these materials with respect to water or oil is kept so as to satisfy the above described conditions in the present invention when the electrophoretic display apparatus is prepared.

More specifically, the respective materials used in the present invention for the charged particles, the inner wall, and the dispersion medium specifically described below do not necessarily achieve the effects of the present invention even when the same combination of these materials is simply chosen. Accordingly, the combination of the materials is a necessary condition.

In order to effect a better drive by obtaining the effects of the present invention, as described above, it is also necessary to perform addition of an additive, surface treatment, or the like so as to provide a desired interaction force.

In the present invention, the combination of the materials for the respective constitutional thereto, when the display device is prepared, the respective surface characteristics of the constitutional elements are designed so as to satisfy the specific conditions defined in the present invention to permit effective action.

(Charged Particles)

The charged particles 3 used in the present invention are not particularly limited to any one of inorganic particles, polymer resin particles, and composite particles of these particles so long as the charged particle surface, the dispersion medium, and the inner wall surface satisfy any one of the above described conditions (A) to (D).

In the case of using the inorganic particle as the charged particles 3, it is possible to use particles of titanium dioxide, graphite, carbon black, silica, alumina, etc. These inorganic particles can be prepared and used as the charged particles 3 in the present invention by obtaining the particles through a particle formation method, a pulverization method, a sol-gel method, etc., and classifying the resultant particles. However, the production process thereof is not limited to the above methods.

In the case of using the polymer resin particles as the charged particles 3, they can be obtained by a known method, such as suspension polymerization, dispersion polymerization, seed polymerization, emulsion polymerization, etc. However, the production process thereof is not limited to these method.

In the case of using the composite particles as the charged particles 3, a polymer used is not particularly limited so long as the polymer can satisfy the above described condition required as the material for the charged particles 3 and may include polymeric materials including: polyethylene-based resins, such as polystyrene, polyethylene, polyester, polymethacrylates, polyacrylates, polyacrylate ester, ethylene-acrylic acid copolymer, ethylene-methacrylic acid copolymer, and ethylene-vinyl acetate copolymer; polyvinyl chloride resin; nitro cellulose; phenolic resin; polyamide resin; etc. These materials may be used singly or a combination of two or more species.

Further, as the charged particles 3, it is also possible to use commercially available particles which may include: "Micropearl" (mfd. by SEKISUI CHEMICAL Co., Ltd.), "Natocospacer" (mfd. by NATOCO Co., Ltd.), "Epocolor" (mfd. by NIPPON SHOKUBAI Co., Ltd.), "Chemisnow" (mfd. by Soken Chemical & Engineering Co., Ltd.), "Tospearl" (mfd. by GE TOSHIBA SILICONES Co., Ltd.), and "Technopolymer" (mfd. by SEKISUI PLASTICS Co., Ltd.) but are not particularly limited thereto.

Further, in order to impart a desired surface characteristic to the charged particles 3, it is possible to coat the surface of charged particle 3. More specifically, it is possible to use a method wherein a monomer for a polymer is subjected to seed polymerization with particles as seeds, a graft polymerization method, a method wherein a particle surface is coated with a polymer through a coupling group of a coupling agent, a method wherein a charged particle surface is coated with a solution of a polymer in a solvent and then the solvent is removed, a method wherein a charged particle surface is subjected to plasma treatment, and the like.

The charged particles 3 in the present invention can be colored depending on a display method of the electrophoretic display apparatus used. A colorant is not particularly limited but may include: pigments, such as carbon black, titanium oxide, barium sulphate, nigrosine, iron black, aniline blue, calco oil blue, chrome yellow, ultramarine blue, Depont oil red, quinoline yellow, methylene blue chloride, phthalocyanine blue, phthalocyanine green, malachite green oxalate, lamp black, rose bengal, C.I. Pigment Red, C.I. Pigment Yellow, C.I. Pigment Blue, C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6, chrome yellow, cadmium yellow, mineral fast yellow, navel yellow, naphthol yellow S, hansa yellow G, permanent yellow NCG, tartrazine lake, molybdenum orange, permanent orange GTR, benzidine orange G, cadmium red, permanent red 4R, watching red calcium salt, brilliant carmine 3B, fast violet B, methyl violet lake, iron blue, cobalt blue, alkali blue lake, victoria blue lake, quinacridon, rhodamine B, fast sky blue, pigment green B, malachite green lake, final yellow green G, etc. Of these pigments, those capable of being used as charged particles alone is usable in the present invention.

Further, as the colorant, it is possible to use dyes including oil dyes, such as Valifast Red, Valifast Yellow, Oplas Red, Oil Scarlet (mfd. by Orient Chemical Industries, Ltd.); Oil Blue V, Oil Greed, Bright Green Sudan IV, Sudan 111(mfd. by Yamato Chemicals Industrial, Inc.); Sumiplast Blue, Sumiplast Red HFG, Sumiplast Red HF4G, Sumiplast Yellow, Whiteflour B (mfd. by Sumitomo Chemical Co., Ltd.); Macrolex Red GS (mfd. by Bayer Japan Ltd.,); Microlis Blue, Microlis Green (mfd. by Nihon Ciba-Geigy K.K.); and dyes, such as Orient Oil Black (mfd. by Orient Chemical Industries, Ltd.); Sumikaron Brilliant Blue, Sumikaron Violet (mfd. by Sumitomo Chemical Co., Ltd.); Kayacryl Black, Kayalon Polyester Blue, Kayaron Polyester Red (mfd. by Nippon Kayaku Co., Ltd.).

As a method of preparing composite particles comprising a polymer and a plurality of pigment particles or/and dye, it is possible to use known methods, such as a method wherein pigment particles or dye is added during a polymerization process of a polymer (including a monomer adding step) and then emulsion polymerization, dispersion polymerization, suspension polymerization or seed polymerization is performed; a method wherein polymer particles are dyed themselves with a dye; a method wherein pigment particles are melt-kneaded with a polymer and then are pulverized; a method wherein pigment particles or dye is added in a solution of a polymer in a solvent, and then the solvent is removed to decrease a temperature of the solution or the solution is subjected to reprecipitation with a poor solvent, thereby to precipitate and form composite particles; and the like. The polymer or dye constituting the composite particles can also be used after being subjected to cross-linking treatment or fixing treatment in order to insolubilize the polymer or dye in a dispersion medium. Further, it is possible to mix pigment particles with a dye depending on a degree of coloring.

An average particle size of the charged particles 3 used in the present invention is not particularly limited but may preferably be in the range of 0.1-10 μm, more preferably in the range of 0.1-3 μm. Below 0.1 μm, a handling characteristic is lowered. Above 3 μm, a display resolution is liable to be lowered. The charged particles 3 can be controlled by a known method, such as dry classification, wet classification, or the like, in order to provide the charged particles 3 with the above described average particle size.

The charged particles 3 may preferably be contained in an amount of 0.1-30 wt. % in the electrophoretic dispersion liquid 4 used in the present invention. The electrophoretic dispersion liquid 4 may preferably have a viscosity of 0.1-30 cp.

The electrophoretic dispersion liquid 4 may contain a plurality of types of charged particles different in color in an amount of preferably 0.1-50 wt. %. However, so long as the above described conditions are satisfied, the amount of the charged particles 3 is not limited to the above range.

(Dispersion Medium)

The dispersion medium 2 in the present invention is not limited particularly so long as it satisfies the above described conditions.

Examples thereof as the hydrophilic dispersion medium may include: alcohols, such as methanol, ethanol, and propanol; polyhydric alcohols and their derivatives, such as ethylene glycol, diethylene glycol, triethylene glycol, propylene glycol, methyl cellosolve acetate, methyl carbitol (diethylene glycol monomethyl ether), ethyl carbitol(diethylene glycol monoethyl ether), and butyl carbitol(diethylene glycol monobutyl ether); ethers, such as methyl cellosolve, ethyl cellosolve, butyl cellosolve, tetrahydrofuran, dioxane, methoxyethanol, ethoxyethanol, and diethylene glycol monoethyl ether; ketones, such as cyclohexanone and diacetone alcohol; pyrrolidone; and derivatives of the above dispersion mediums.

As the hydrophobic dispersion medium, it is possible to use: aromatic hydrocarbon solvents, such as benzene, toluene, xylene, and naphtheric acid-based hydrocarbon; aliphatic hydrocarbon solvents, such as hexane, cyclohexane, kerosine, paraffin-based hydrocarbon, and isoparaffin-based hydrocarbon; a halogenated hydrocarbon solvent; silicone oil; high-purity petroleum; and the like.

As the hydrophobic and lipophobic dispersion medium, it is possible to use: fluorine-containing solvents, such as fluoroethylene, octafluorocyclo-pentane, and hydrofluoro ether. As a commercially available hydrophobic and lipophobic dispersion medium, it is possible to use: "Asahi-CLEAN" (mfd. by Asahi Glass Co., Ltd.), "Novec" (mfd. by Ryoko Chemical Co., Ltd.), and "e Clean 21" (mfd. by Kaneko Chemical Co., Ltd.).

These dispersion mediums may be used singly or in mixture of two or more species.

In the present invention, the dispersion medium 2 can be colored a color which is different from the color of the charged particles 3, depending on a display method of the electrophoretic display apparatus used. As a colorant for this purpose, the colorant is not particularly limited so long as it is an oil-soluble dye which is soluble in the dispersion medium.

(Partition Wall)

The partition wall 5 may preferably be light-transmissive, more preferably be one capable of performing matching for refractive index thereof with that of the electrophoretic dispersion liquid 4 or the substrate 1 as an observation surface. Specific examples of a material for the partition wall 5 may include: inorganic and organic materials, such as $SiO_2$, acrylic resin, epoxy resin, norboenene, fluorine-containing resin, etc.

A method of forming the partition wall 5 may be exposure/etching with a photosensitive resin, printing, molding, etc., but is not particularly limited so long as the resultant partition wall 5 is capable of satisfying the above described conditions.

The above described conditions between the dispersion medium 2, the charged particle 3, and the inner wall 7 can be realized by forming the inner wall 7 as a microcapsule, as shown in FIG. 3(b). As a method of forming microcapsules between the substrates, it is possible to use a known method, such as in-situ method, interfacial polymerization, coacervation, or the like. A wall material for the microcapsules is not particularly limited so long as the resultant inner wall satisfies the above described conditions. Examples thereof may include: polyurethane, polyurea, polyurea-polyurethane, urea-formaldehyde resin, melamine-formaldehyde resin, polyamide, polyester, polysulfonamide, polycarbonate, polysulfinate, epoxy resin, polyacrylate, polymethacrylate, polyvinyl acetate, polyvinyl alcohol, gelatin, etc.

The microcapsules used in the present invention may generally have a size of 1-500 μm, preferably 20-100 μm.

(Insulating Layer)

A material for the insulating layer 6 may preferably be a thin film in which a pinhole is less liable to be formed. Examples thereof may include: polyimide resin, polyester resin, polyacrylate resin, polymethacrylate resin, polycarbonate resin, epoxy resin, norbornene resin, urethane resin, $SiO_2$, and their composite materials, etc.

(Inner Wall)

Figure 2:
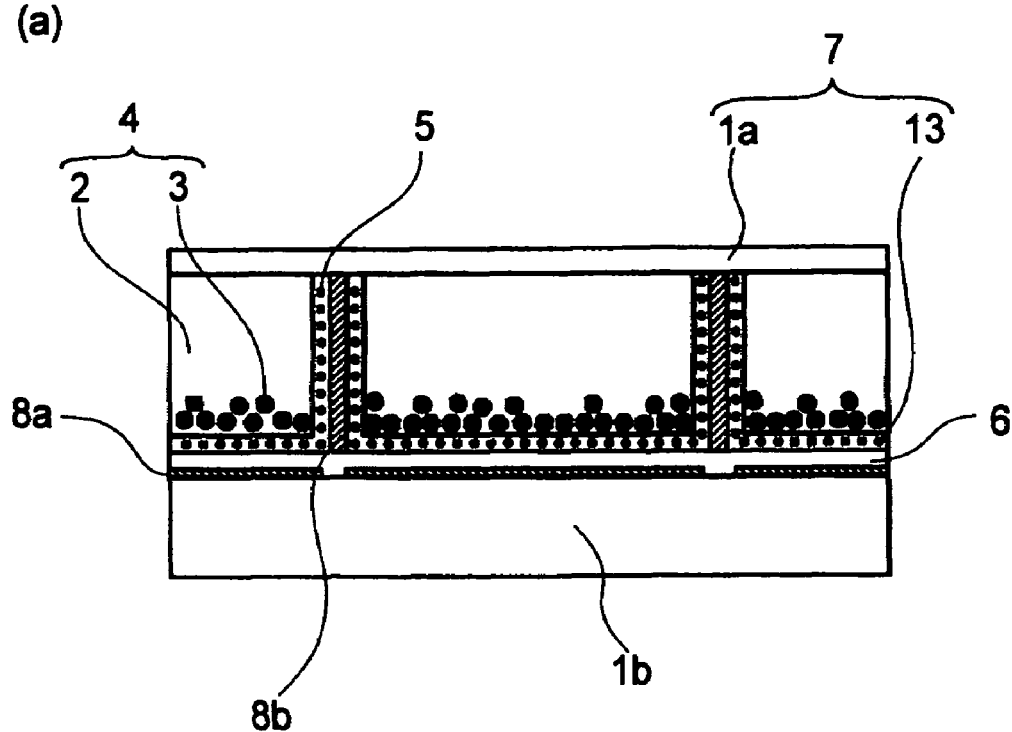
Figure 2:
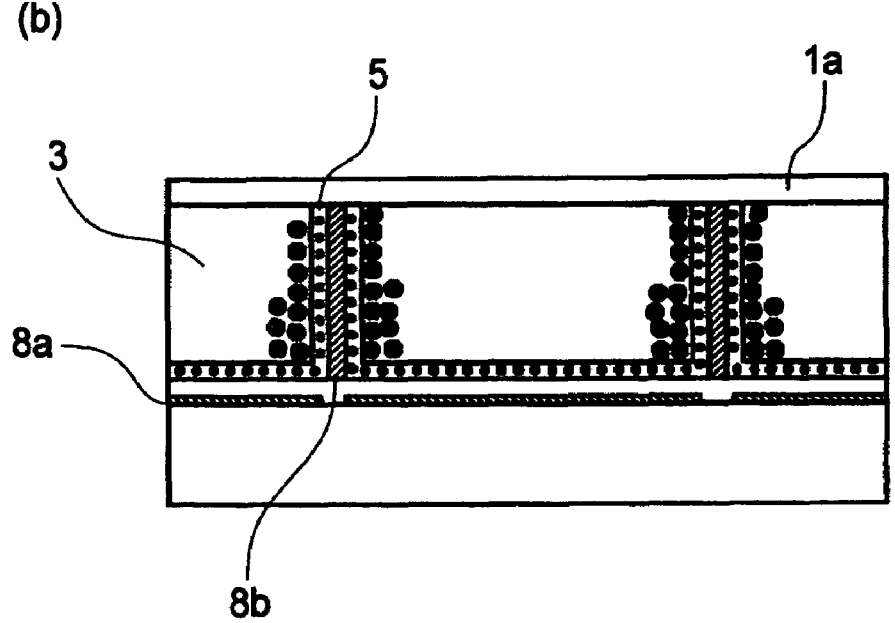

As described above, the surface layer constituting the space defined by the pair of substrates 1a and 1b or the surface layer constituting the small space defined by the substrate 1a, the partition wall 5, and the insulating layer 6 is defined as the inner wall 7. However, as shown in FIGS. 2(a) and 2(b), by disposing a coating layer 13, as a part of the partition wall 7, on the surface of the substrate 1 and/or the partition wall 5 and/or the insulating layer, it is possible to impart a desired characteristic required in the present invention.

Further, values of a volume resistivity of the inner wall 7 and the coating layer 13 may desirably be adjusted as desired resistivity values, such as a high resistivity, a medium resistivity, and a low resistivity.

The coating layer 13 may be formed by any method so long as the above described conditions are satisfied. Examples of the method may include: a known coating method using a resin having a desired characteristic; a method in which a resin layer is formed by vapor deposition or the like; grafting of the substrate 1a and/or the partition wall 5 and/or the insulating layer 6 to the surface layer; coupling treatment with a coupling agent; and the like.

(Additive)

In the dispersion medium 2 used in the present invention, it is possible to add a charge control agent, as desired, in order to impart chargeability to the charged particles 3 or aiding electrification. The charge control agent is not particularly limited so long as it is soluble in the dispersion medium. Examples thereof may include: anionic surfactants, such as carboxylate, sulfonate, sulfate, and phosphate; cationic surfactants, such as aliphatic amine salt, quaternary ammonium salt, aromatic quaternary ammonium salt, and hetero-ring quaternary animonium salt; amphoteric surfactants, such as carboxy betaine, sulfo betaine, aminocarboxylate, and imidazoline derivatives; nonionic surfactants, such as those of ether-type, etherester-type, ester type, and nitrogen-containing type; metallic soap; fluorine-containing surfactant; reactive surfactant; block copolymer; graft polymer; etc. These additives may be used singly or in mixture of two or more species.

Further, in the dispersion medium 2, it is also possible to add a dispersion stabilizer of the charged particles 3 or a polymeric resin, soluble in the dispersion medium, as a deposition suppressing agent of the charged particles on the inner wall. Examples thereof may include: polymers, such as polybutadiene, polyisoprene, polyisobutylene, polybutene, styrene-butadiene copolymer, styrene-isoprene copolymer, styrene-maleic anhydride copolymer, norbornene resin, polyethylene wax, polyvinyl alcohols having various degrees of saponification and various molecular weights, and polyvinyl pyrrolidone; polyvalent metal phosphates, such as calcium phosphate, magnesium phosphate, aluminum phosphate, and zinc phosphate; carbonates, such as calcium carbonate and magnesium carbonate; inorganic salts, such as calcium metasilicate, calcium sulfate, and barium sulfate; inorganic (hydro-)oxides, such as calcium hydroxide, magnesium hydroxide, aluminum hydroxide, silica, gentonite, and alumina; surfactants, such as sodium dodecylbenzenesulfonate, sodium tetradodecylsulfonate, sodium pentadecylsulfonate, sodium octylsulfonate, sodium oleate, sodium laurate, sodium stearate, and potassium stearate; and fluorine-containing surfactant, such as perfluoroalkyl group-containing oligomer. Of these resins or compounds, styrene-butadiene copolymer is preferred. Examples of a commercially available styrene-butadiene copolymer may include: "E-SBR" and "S-SBR" (mfd. by JSR Corp.); "NIPOL 1502", "NIPOL 1712", "NIPOL NS112", "NIPOL NS116", "NIPOL 1006", and "NIPOL 1009" (mfd. by Zeon Corp.); "Tufdene", "Tufprene", and "Asaprene" (mfd. by Asahi Kasei Chemicals Corp.); and "Sumitomo SBR" (mfd. by Sumitomo Chemical Co., Ltd.).

Further, in order to stabilize the chargeability of the charged particles in the present invention, it is possible to use a rosin ester or a resin derivative. The rosin ester or rosin derivative is not particularly limited so long as it is soluble in the dispersion medium. Examples thereof may include: gum rosin, wood rosin, tall oil rosin, rosin-modified maleic acid, rosin-modified pentaerythritol, rosin glycerinate, partially hydrogenated rosin methylate, partially hydrogenated rosin glycerinate, partially hydrogenated rosin triethyleneglycol ester, completely hydrogenated rosin pentaerythritol ester, maleic acid-modified rosin ester, fumaric acid-modified rosin ester, acrylic acid-modified rosin ester, maleic acid-modified pentaerythritol ester, fumaric acid-modified pentaerythritol ester, acrylic acid-modified rosin pentaerythritol ester, maleic acid-modified rosin glycerinate, fumaric acid-modified rosin glycerinate, and acrylic acid-modified rosin glycerinate. Specific examples of a commercially available rosin ester or derivative may include: "Neotol" (mfd. by Harima Chemicals, Inc.); and "Pensel", "Ester gum" and "Super ester" (mfd. by Arakawa Chemical Industries, Ltd.). In the case where the rosin ester or derivative is not contained in the dispersion medium, chargeability of the charged particles 3 is not stabilized, so that a charge polarity is inverted or the charged particles 3 do not electrophoretically migrate in some cases.

The rosin ester or rosin derivative may preferably be contained in an amount of 0.01-5 wt. parts, more preferably 0.05-3 wt. parts, in 100 wt. parts of the dispersion medium 2.

In the present invention, the above described compounds for the rosin ester or rosin derivative contained in the dispersion medium 2 may be used singly or in mixture of two or more species.

(Substrate)

As the substrates 1a and 1b, it is possible to use: films of polymers, such as polyethylene terephthalate (PET), polyether sulfone (PES), polyimide (PI), polyethylene naphthalate (PEN), polycarbonate (PC), and the like; inorganic materials, such as glass and quartz; and metals, such as SUS, aluminum, titanium, and the like. As the substrate 1 as the observation surface, it is preferable that a material which haws a high transmittance with respect to visible light and a high heat resistance is used.

(Electrode)

As the electrodes 8a and 8b, it is possible to use inorganic and organic conducts materials. The respective electrodes can be formed by (metal) plating, (vacuum) vapor deposition, or the like. Examples of a material for the electrodes may include: Au, Al, Ti, TiC, Cu, ITO (indium tin oxide), ATO (antimony-doped tin oxide), FTO (fluorine-doped tin oxide), ZnO, AZO (Al-doped ZnO), etc. In addition, it is possible to use materials, known as an electroconductive film material, such as a metal thin film, an electroconductive nitride film, an electroconductive boride, an organic electroconductive film, etc.

Hereinbelow, the present invention will be described more specifically based on Examples.

In the following Examples, as the charged particles 3, those prepared by forming a surface coating layer on particles (charged particles A and charged particles B) as core particles.

(1) Charged Particles A

Charged particles A were black-dyed particles prepared by dying polymer particles of polystyrene (PS) with dyes ("Valifast Black 3810" and "Orient Oil Black" mfd by Orient Chemical Industries, Ltd.) and had an average particle size of 3 μm.

(2) Charged Particles B

Charged particles B were polymer particles comprising 85 wt. parts of polystyrene (PS) and 15 wt. parts of carbon black (CB) particles (average particle size: 0.02 μm) and had an average particle size of 2.5 μm.

The average particle size of the charged particles and a thickness of the surface coating layer which coats uncoated particles were measured, by a scanning electron microscope, as an average of those at 20 sampling points.

EXAMPLE 1

An electrophoretic display apparatus having a structure as shown in FIGS. 2(a) and 2(b) was prepared in the following manner.

On a supporting substrate 1b, an electrode 8a was formed. The supporting substrate 1b may be formed of an inorganic material, such as glass, quartz, or the like; a film of polymer, such as PET, PES, or the like; and SUS. In this example, a glass substrate was used as the substrate 1b. The electrode 8a also functioned as a reflection layer, so that a resultant electrophoretic display apparatus was of a reflection type.

The electrode 8a may be formed of any electroconductive material capable of being patterned. In this example, a 150 nm-thick aluminum (Al) layer was formed by vacuum vapor deposition. The electrode 8a was formed in a pattern providing a display segment of 100 μm×100 μm. On the electrode 8a, an insulating layer 6 was formed of acrylic resin.

Then, on the insulating layer 6, a partition wall supporting portion having a height of 20 μm and a width of 5 μm was formed of epoxy resin so as to be located at a position corresponding to a boundary between adjacent (patterned) electrodes 8a. Further, so as to cover the partition wall supporting portion, a 150 μ-thick layer of titanium (Ti) was formed by vacuum vapor deposition to form an electrode 8b having a partition wall structure including the partition wall supporting portion.

Next, a 200 nm-thick coating layer 13 was formed of silicone resin compound containing silicon atom so as to cover the electrode 8b and the insulating layer 6 to form a partition wall 5 (including the partition wall supporting portion, the electrode 8b, and the coating layer 13) at the boundary between the adjacent electrodes 8a. In an inner space of the coating layer 13, an electrophoretic dispersion liquid 4 was filled. Thereafter, a transparent substrate 1a on a display side and an upper portion of the partition wall 5 were bonded by a UV curable adhesive, followed by wiring of the electrodes 8a and 8b to prepare an electrophoretic display apparatus.

The transparent substrate 1a may be formed of any material so long as it is excellent in transparency and capable of performing matching for refractive index with the electrophoretic dispersion liquid 4 and the partition wall 5. In this example, a 100 μm-thick polycarbonate film was used.

As shown in FIGS. 2(a) and 2(b), the thus prepared electrophoretic display apparatus had such a structure that a plurality of closed spaces each corresponding to the display segment partitioned by adjacent partition wall 5 portions. In each closed space defined by the transparent substrate 1a, the supporting substrate 1b, and the partition wall 5, charged particles 3 and a dispersion medium 2 for dispersing the charged particles 3 were held. On the supporting substrate 1b defining each closed space, the electrode 8a was disposed and thereon the insulating layer 6 was disposed so as to cover the electrode 8a. The electrode 8b was disposed between the adjacent electrode 8a portions so as to separate adjacent display segments from each other. The electrode 8b was a part of the partition wall 5 and also functioned as the partition wall 5. The coating layer 13 was disposed so as to cover the electrode 8b and the insulating layer 6. The electrode 8a at each pixel (display segment) was connected with a switching element (not shown). The electrode 8b at each pixel was connected with those at other pixels to provide a common electrode.

Next, preparation methods of the charged particles 3 and the electrophoretic dispersion liquid 4 will be described.

In this example, as the charged particles 3, black charged particles prepared by coating the surfaces of charged particles A with a 20 nm-thick fluorine-containing acrylate layer by graft polymerization were used.

The electrophoretic dispersion liquid 4 was prepared by mixing 1 wt. part of the above prepared charged particles 3, 100 wt. parts of the dispersion medium 2 comprising an isoparaffin-based hydrocarbon solvent ("Isopar H", mfd. by Exxon Corp.), 1.0 wt. part of polybutadiene as the deposition control agent, and 0.1 wt. part of zirconium octanate as the charge stabilizer.

The dispersion medium 2 had a surface tension of 23 mN/m and thus was a hydrophobic dispersion medium. The charged particles 3 had a contact angle with respect to water of 79 degrees and a surface free energy of 24 mN/m and contained fluorine atom and a hydrophobic and lipophobic surface layer. The coating layer 13 had a contact angle with respect to water of 105 degrees and a surface free energy of 25 mN/m and thus constituted an inner wall having a hydrophobic surface layer.

The above prepared electrophoretic display apparatus was subjected to display by applying a voltage of ±25 V for not more than 2 sec.

The charged particles 3 in this example were negatively charged to be quickly moved onto a positive-polarity electrode when the voltage was applied. More specifically, when the electrode 8b was used as a common electrode and the positive-polarity voltage was applied to the electrode 8b, the negatively charged charged particles 3 were moved on the electrode 8a to cover the electrode 8a, so that the black charged particles 3 were visually recognized when viewed from above the substrate 1 on the observation side. As a result, black display was effected at an associated pixel (FIG. 2(a)).

On the other hand, when a negative-polarity voltage was applied to the electrode 8a, the negatively charged charged particles 3 were moved on the electrode 8b to cover the partition wall 5, so that the electrode 8a as a reflection layer was visually recognized when viewed from above the substrate 1 on the observation side. As a result, white display was effected at an associated pixel (FIG. 2(b)).

A response speed was not more than 60 msec.

Then, when the electrophoretic display apparatus was driven for one week while switching the polarity of applied voltage every 2 seconds and states of agglomeration of the charged particles 3 and deposition and accumulation of the charged particles 3 and deposition and accumulation of the charged particles 3 on the inner wall were observed through a microscope, the deposition and accumulation of the charged particles 3 on the inner wall were observed through a microscope, the deposition and accumulation of the charged particles 3 were not observed. As a result, a stable display state was retained.

Further, even when the applied voltage was changed from a voltage for placing the charged particles in a predetermined written state to 0 V and then the electrophoretic display apparatus was left standing for one week, the predetermined written state of the charged particles by voltage application was retained. As a result, the electrophoretic display apparatus had a memory characteristic. The electrophoretic display apparatus similarly had the memory characteristic even when the electrophoretic display apparatus was disposed in any direction with respect to gravitation.

Further, when a voltage was again applied to the electrophoretic display apparatus in the memory state, the charged particles were immediately moved in response to the voltage application to the electrodes. Accordingly, the electrophoretic display apparatus of this example was excellent in a re-driving performance from the memory state.

EXAMPLE 2

In this example, as the charged particles 3, black charged particles prepared by coating the surfaces of charged particles B with a 20 nm-thick fluorine-containing acrylate layer by graft polymerization were used.

The electrophoretic dispersion liquid 4 was prepared by mixing 1 wt. part of the above prepared charged particles 3, 100 wt. parts of the dispersion medium 2 comprising an isoparaffin-based hydrocarbon solvent ("IP Solvent", mfd. by Idemitsu Kosan Co., Ltd.), 0.8 wt. part of perfluoroalkyl group-containing oligomer as the deposition suppression agent, and 2 wt. part of rosin ester as the charge stabilizer.

The coating layer 13 was formed of acrylic resin and subjected to surface-treatment with a fluorine-containing silane coupling agent.

Other constitutions and production manners were the same as in Example 1.

The dispersion medium 2 constituting the electrophoretic display apparatus had a surface tension of 23 mN/m and thus was a hydrophobic dispersion medium. The charged particles 3 had a contact angle with respect to water of 78 degrees and a surface free energy of 24 mN/m and contained fluorine atom and a hydrophobic and lipophobic surface layer. The coating layer 13 had a contact angle with respect to water of 72 degrees and a surface free energy of 28 mN/m and thus constituted an inner wall having a hydrophobic surface layer.

The above prepared electrophoretic display apparatus was subjected to display by applying a voltage of ±20 V for not more than 2 sec.

A response speed was not more than 60 msec.

Then, when the electrophoretic display apparatus was driven for one week while switching the polarity of applied voltage every 2 seconds and states of agglomeration of the charged particles 3 and deposition and accumulation of the charged particles 3 and deposition and accumulation of the charged particles 3 on the inner wall were observed through a microscope, although an agglomerate (size: about 8 μm) of several charged particles (approximately two or three particles) was observed at each pixel, the charged particles were re-dispersed by drive of the electrophoretic display apparatus to drive also the agglomerate of the charged particles. Further, the deposition and accumulation of the charged particles 3 on the inner wall were observed through a microscope, the deposition and accumulation of the charged particles 3 were not observed.

Further, even when the applied voltage was changed from a voltage for placing the charged particles in a predetermined written state to 0 V and then the electrophoretic display apparatus was left standing for one week, the predetermined written state of the charged particles by voltage application was retained. As a result, the electrophoretic display apparatus had a memory characteristic. The electrophoretic display apparatus similarly had the memory characteristic even when the electrophoretic display apparatus was disposed in any direction with respect to gravitation.

Further, when a voltage was again applied to the electrophoretic display apparatus in the memory state, the charged particles were immediately moved in response to the voltage application to the electrodes. Accordingly, the electrophoretic display apparatus of this example was excellent in a re-driving performance from the memory state.

EXAMPLE 3

In this example, as the charged particles 3, black charged particles prepared by coating the surfaces of charged particles A with a 20 nm-thick siloxane monomer layer by graft polymerization were used.

Other constitutions and production manners were the same as in Example 1.

The dispersion medium 2 had a surface tension of 26 mN/m and thus was a hydrophilic dispersion medium. The charged particles 3 had a contact angle with respect to water of 102 degrees and a surface free energy of 24 mN/m and contained a hydrophobic surface layer.

The above prepared electrophoretic display apparatus was subjected to display by applying a voltage of ±20 V for not more than 2 sec.

The charged particles 3 in this example were positively charged to be quickly moved onto a negative-polarity electrode when the voltage was applied. More specifically, when the electrode 8b was used as a common electrode and the negative-polarity voltage was applied to the electrode 8b, the positively charged charged particles 3 were moved on the electrode 8a to cover the electrode 8a, so that the black charged particles 3 were visually recognized when viewed from above the substrate 1 on the observation side. As a result, black display was effected at an associated pixel (FIG. 2(a)).

On the other hand, when a positive-polarity voltage was applied to the electrode 8a, the positively charged charged particles 3 were moved on the electrode 8b to cover the partition wall 5, so that the electrode 8a as a reflection layer was visually recognized when viewed from above the substrate 1 on the observation side. As a result, white display was effected at an associated pixel (FIG. 2(b)).

A response speed was not more than 100 msec.

Then, even when the electrophoretic display apparatus was driven for one week while switching the polarity of applied voltage every 2 seconds and states of agglomeration of the charged particles 3 and deposition and accumulation of the charged particles 3 and deposition and accumulation of the charged particles 3 on the inner wall were observed through a microscope, the deposition and accumulation of the charged particles 3 on the inner wall were observed through a microscope, the deposition and accumulation of the charged particles 3 were not observed. As a result, a stable display state was retained.

Further, even when the applied voltage was changed from a voltage for placing the charged particles in a predetermined written state to 0 V and then the electrophoretic display apparatus was left standing for one week, the predetermined written state of the charged particles by voltage application was retained. As a result, the electrophoretic display apparatus had a memory characteristic. The electrophoretic display apparatus similarly had the memory characteristic even when the electrophoretic display apparatus was disposed in any direction with respect to gravitation.

Further, when a voltage was again-applied to the electrophoretic display apparatus in the memory state, the charged particles were immediately moved in response to the voltage application to the electrodes. Accordingly, the electrophoretic display apparatus of this example was excellent in a re-driving performance from the memory state.

EXAMPLE 4

In this example, as the charged particles 3, black charged particles prepared by coating the surfaces of charged particles B with a 20 nm-thick polyamide layer by graft polymerization were used.

The coating layer 13 was formed of acrylic resin.

Other constitutions and production manners were the same as in Example 1.

The charged particles 3 constituting the electrophoretic display apparatus had a contact angle with respect to water of 64 degrees and a surface free energy of 48 mN/m and contained a hydrophilic surface layer. The coating layer 13 had a contact angle with respect to water of 75 degrees and a surface free energy of 55 mN/m and thus constituted an inner wall having a hydrophilic surface layer.

The above prepared electrophoretic display apparatus was subjected to display by applying a voltage of ±20 V for not more than 2 sec.

A response speed was not more than 100 msec.

Then, when the electrophoretic display apparatus was driven for one week while switching the polarity of applied voltage every 2 seconds and states of agglomeration of the charged particles 3 and deposition and accumulation of the charged particles 3 and deposition and accumulation of the charged particles 3 on the inner wall were observed through a microscope, the deposition and accumulation of the charged particles 3 on the inner wall were observed through a microscope, the deposition and accumulation of the charged particles 3 were not observed. As a result, a stable display state was retained.

Further, even when the applied voltage was changed from a voltage for placing the charged particles in a predetermined written state to 0 V and then the electrophoretic display apparatus was left standing for one week, the predetermined written state of the charged particles by voltage application was retained. As a result, the electrophoretic display apparatus had a memory characteristic. The electrophoretic display apparatus similarly had the memory characteristic even when the electrophoretic display apparatus was disposed in any direction with respect to gravitation.

Further, when a voltage was again applied to the electrophoretic display apparatus in the memory state, the charged particles were immediately moved in response to the voltage application to the electrodes. Accordingly, the electrophoretic display apparatus of this example was excellent in a re-driving performance from the memory state.

COMPARATIVE EXAMPLE 1

In this comparative example, as the charged particles 3, black charged particles prepared by coating the surfaces of charged particles A with a 20 nm-thick polystearyl methacrylate (PSMA) layer by graft polymerization were used.

Other constitutions and production manners were the same as in Example 1.

The charged particles 3 constituting the electrophoretic display apparatus had a contact angle with respect to water of 74 degrees and a surface free energy of 48 mN/m and contained a hydrophilic surface layer.

The above prepared electrophoretic display apparatus was subjected to display by applying a voltage of ±20 V for not more than 2 sec.

A response speed was not more than 100 msec.

Further, when the electrophoretic display apparatus was driven at a voltage application time 10 msec, a response speed was not more than 60 msec.

Then, when the electrophoretic display apparatus was driven for one week while switching the polarity of applied voltage every 2 seconds and states of agglomeration of the charged particles 3 and deposition and accumulation of the charged particles 3 and deposition and accumulation of the charged particles 3 on the inner wall were observed through a microscope, the deposition and accumulation of the charged particles 3 on the inner wall were observed through a microscope, the deposition and accumulation of the charged particles 3 were not observed. As a result, a stable display state was retained.

However, even when the applied voltage was changed from a voltage for placing the charged particles in a predetermined written state to 0 V, the charged particles were started to be moved, due to thermal fluctuation, immediately after the applied voltage was changed to 0 V and lost their written state by voltage application. After one hour, the charged particles were completely dispersed over the entire pixel surface to result in a black display state (FIG. 2($a$)).

INDUSTRIAL APPLICABILITY

As described hereinabove, according to the electrophoretic display apparatus of the present invention, an image is continuously displayed stably without supplying a display retention voltage only by once effecting image writing in accordance with electric addressing. As a result, no electric power is required at any time except for the time of effecting display rewriting of the image and it is possible to arbitrarily adjust interactive forces (attraction and repulsion forces) between the charged particles, the dispersion medium, and the inner wall constituting a display portion of the electrophoretic display. apparatus. Consequently, the electrophoretic display apparatus has a display stability under no voltage application and a drive stability under voltage application in combination and it is possible to reduce power consumption by reducing a voltage for performing electrophoretic migration. Accordingly, the electrophoretic display apparatus of the present invention is applicable to electronic paper, reading terminal, and the like which are required to be driven with a small-sized battery at a low voltage.

While the invention has been described with reference to the structures disclosed herein, it is not confined to the details set forth and this application is intended to cover such modifications or changes as may come within the purpose of the improvements or the scope of the following claims.

The invention claimed is:

1. An electrophoretic display apparatus, comprising:
a display portion,
an electrophoretic dispersion liquid, contained in the display portion, comprising charged particles and a dispersion medium for dispersing the charged particles, and
an electrode for driving the electrophoretic dispersion liquid,
wherein a surface of charged particle, the dispersion medium, and a surface of an inner wall on which the charged particles are to be deposited satisfy any one of the following (A) to (D):
(A) the charged particle surface is hydrophilic, the dispersion medium is hydrophobic or is hydrophobic and lipophobic, and the inner wall surface is hydrophilic, (B) the charged particle surface is hydrophobic, the dispersion medium is hydrophilic or is hydrophobic and lipophobic, and the inner wall surface is hydrophobic, (C) the charged particle surface is hydrophobic and lipophobic, the dispersion medium is hydrophobic or hydrophilic, and the inner wall surface is hydrophobic, with the proviso that the dispersion medium has a lower hydrophobicity than the inner wall surface when the dispersion medium is hydrophobic, and (D) the charged particle surface is hydrophobic and lipophobic, the dispersion medium is hydrophobic or hydrophilic, and the inner wall surface is hydrophobic and lipophobic.

2. An apparatus according to claim 1, wherein at least one of the charged particle surface, the dispersion medium, and the inner wall surface is hydrophobic and contains at least one species of a group selected from the group consisting of amino group, amido group, imido group, carboxyl group, carbonyl group, hydroxyl group, and sulfo group.

3. An apparatus according to claim 1, wherein at least one of the charged particle surface, the dispersion medium, and the inner wall surface is hydrophobic and contains at least one species of a group selected from the group consisting of a halogen-substituted derivative, silicon atom, alkyl group, phenyl group, benzyl group, and naphthyl group.

4. An apparatus according to claim 1, wherein at least one of the charged particle surface, the dispersion medium, and the inner wall surface is hydrophobic and lipophobic and contains at least fluorine atom.

5. An apparatus according to claim 1, wherein the dispersion medium is hydrophobic and an insulating liquid.

6. An apparatus according to any one of claim 1-5, wherein the charged particle surface has a fluorine atom-containing compound, the inner wall surface has a silicon atom-containing compound, and the dispersion medium is a solvent containing a paraffin-based hydrocarbon compound.

7. An apparatus according to claim 1, wherein the charged particles and the dispersion medium are accommodated in a plurality of sections partitioned by a partition wall, and the inner wall has a plurality of portions which contain the partition wall surface.

8. An apparatus according to any one of claims 1-5 or 7, wherein the dispersion medium has a contact angle of 30 degrees with respect to the inner wall surface.

* * * * *

UNITED STATES PATENT AND TRADEMARK OFFICE
CERTIFICATE OF CORRECTION

PATENT NO.        : 7,379,229 B2
APPLICATION NO.   : 10/553769
DATED             : May 27, 2008
INVENTOR(S)       : Takuro Yamazaki It is certified that error appears in the above-identified patent and that said Letters Patent is hereby corrected as shown below:

ON THE TITLE PAGE:

Title Item [54], "ELECTROPHOTOGRAPHIC DISPLAY APPARATUS"
        should read --ELECTROPHORETIC DISPLAY APPARATUS--; and
   Inventor Item [75], "Takuro Yamazaki, Kawasaki (JP)" should read
        --Takuro Yamazaki, Zama (JP)--.

COLUMN 1:

Line 42, "varies" should read --various--;
   Line 46, "of image" should read --images--; and
   Line 59, "lawellar" should read --lamellar--.

COLUMN 2:

Line 1, "there" should read --it--;
   Line 17, "stably" should read --stable--;
   Line 48, "those" should read --the--; and
   Line 58, "followings" should read --following--.

COLUMN 3:

Line 27, "TO" should read --OUT--; and
   Line 60, "re1spect" should read --respect--.

COLUMN 4:

Line 27, "super ordinate" should read --superordinate--;
   Line 54, "preferably" should read --preferably be--; and
   Line 56, delete "The partition wall 5 having also a function as the spacer."

COLUMN 5:

Line 9, delete "the" (1$^{st}$ occurrence).

COLUMN 6:

Line 32, "an" should read --on--.

UNITED STATES PATENT AND TRADEMARK OFFICE
CERTIFICATE OF CORRECTION

| | |
|---|---|
| PATENT NO. | : 7,379,229 B2 |
| APPLICATION NO. | : 10/553769 |
| DATED | : May 27, 2008 |
| INVENTOR(S) | : Takuro Yamazaki |

It is certified that error appears in the above-identified patent and that said Letters Patent is hereby corrected as shown below:

COLUMN 7:

Line 10, delete "have".

COLUMN 8:

Line 59, "a" should read --an--; and
Line 62, "are" should read --which are--.

COLUMN 10:

Line 43, "hydrophobic" should read --hydrophobicity--;
Line 48, "hydrophobic" should read --hydrophobicity--;
Line 50, "different in hydrophobic" should read
    --difference in hydrophobicity--; and
Line 55, "and" should read --are--.

COLUMN 12:

Line 42, "With" should read --with--.

COLUMN 13:

Line 35, "constitutional," should read --constitution--; and
Line 37, "constitutional" should read --constituent--.

COLUMN 14:

Line 35, "Depont" should read --Dupont--;
Line 44, "navel" should read --naval--; and
Line 57, "Greed," should read --Green,--.

COLUMN 17:

Line 63, "resin" should read --rosin--.

UNITED STATES PATENT AND TRADEMARK OFFICE
CERTIFICATE OF CORRECTION

PATENT NO. : 7,379,229 B2
APPLICATION NO. : 10/553769
DATED : May 27, 2008
INVENTOR(S) : Takuro Yamazaki It is certified that error appears in the above-identified patent and that said Letters Patent is hereby corrected as shown below:

COLUMN 18:

Line 35, "haws" should read --has--; and
Line 40, "conducts" should read --conductive--.

COLUMN 22:

Line 64, "again-applied" should read --again applied--.

COLUMN 26:

Line 9, "claim 1-5" should read --claims 1-5,--.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO.       : 7,379,229 B2
APPLICATION NO.  : 10/553769
DATED            : May 27, 2008
INVENTOR(S)      : Takuro Yamazaki It is certified that error appears in the above-identified patent and that said Letters Patent is hereby corrected as shown below:

ON THE TITLE PAGE:

Title Item [54], and Column 1, lines 1 and 2, "ELECTROPHOTOGRAPHIC
        DISPLAY APPARATUS" should read --ELECTROPHORETIC
        DISPLAY APPARATUS--; and
   Inventor Item [75], "Takuro Yamazaki, Kawasaki (JP)" should read
        --Takuro Yamazaki, Zama (JP)--.

COLUMN 1:

Line 42, "varies" should read --various--;
   Line 46, "of image" should read --images--; and
   Line 59, "lawellar" should read --lamellar--.

COLUMN 2:

Line 1, "there" should read --it--;
   Line 17, "stably" should read --stable--;
   Line 48, "those" should read --the--; and
   Line 58, "followings" should read --following--.

COLUMN 3:

Line 27, "TO" should read --OUT--; and
   Line 60, "re1spect" should read --respect--.

COLUMN 4:

Line 27, "super ordinate" should read --superordinate--;
   Line 54, "preferably" should read --preferably be--; and
   Line 56, delete "The partition wall 5 having also a function as the spacer."

COLUMN 5:

Line 9, delete "the" (1$^{st}$ occurrence).

COLUMN 6:

Line 32, "an" should read --on--.

UNITED STATES PATENT AND TRADEMARK OFFICE
CERTIFICATE OF CORRECTION

| | |
|---|---|
| PATENT NO. | : 7,379,229 B2 |
| APPLICATION NO. | : 10/553769 |
| DATED | : May 27, 2008 |
| INVENTOR(S) | : Takuro Yamazaki |

It is certified that error appears in the above-identified patent and that said Letters Patent is hereby corrected as shown below:

COLUMN 7:

Line 10, delete "have".

COLUMN 8:

Line 59, "a" should read --an--; and
    Line 62, "are" should read --which are--.

COLUMN 10:

Line 43, "hydrophobic" should read --hydrophobicity--;
    Line 48, "hydrophobic" should read --hydrophobicity--;
    Line 50, "different in hydrophobic" should read
        --difference in hydrophobicity--; and
    Line 55, "and" should read --are--.

COLUMN 12:

Line 42, "With" should read --with--.

COLUMN 13:

Line 35, "constitutional," should read --constitution--; and
    Line 37, "constitutional" should read --constituent--.

COLUMN 14:

Line 35, "Depont" should read --Dupont--;
    Line 44, "navel" should read --naval--; and
    Line 57, "Greed," should read --Green,--.

COLUMN 17:

Line 63, "resin" should read --rosin--.

UNITED STATES PATENT AND TRADEMARK OFFICE
CERTIFICATE OF CORRECTION

PATENT NO. : 7,379,229 B2
APPLICATION NO. : 10/553769
DATED : May 27, 2008
INVENTOR(S) : Takuro Yamazaki It is certified that error appears in the above-identified patent and that said Letters Patent is hereby corrected as shown below:

COLUMN 18:

Line 35, "haws" should read --has--; and
Line 40, "conducts" should read --conductive--.

COLUMN 22:

Line 64, "again-applied" should read --again applied--.

COLUMN 26:

Line 9, "claim 1-5" should read --claims 1-5,--.

This certificate supersedes the Certificate of Correction issued November 4, 2008.

Signed and Sealed this

Twenty-fifth Day of November, 2008

JON W. DUDAS
*Director of the United States Patent and Trademark Office*